(12) United States Patent
Shirley

(10) Patent No.: US 6,378,014 B1
(45) Date of Patent: Apr. 23, 2002

(54) TERMINAL EMULATOR FOR INTERFACING BETWEEN A COMMUNICATIONS PORT AND A KVM SWITCH

(75) Inventor: Timothy C. Shirley, Monroe, WA (US)

(73) Assignee: Apex Inc., Redmond, WA (US)

( * ) Notice: Subject to any disclaimer, the term of this patent is extended or adjusted under 35 U.S.C. 154(b) by 0 days.

(21) Appl. No.: 09/382,544

(22) Filed: Aug. 25, 1999

(51) Int. Cl.[7] .................. G06F 13/00; G06F 15/173; G09G 5/00
(52) U.S. Cl. .................. 710/100; 709/239; 345/1.1; 345/156
(58) Field of Search .................. 345/156, 1.1, 2.1, 345/3.1, 5, 716; 710/38, 131; 709/217, 239, 314

(56) References Cited

U.S. PATENT DOCUMENTS

| | | | |
|---|---|---|---|
| 4,442,321 A | * 4/1984 | Stehman | 379/221.14 |
| 5,430,850 A | 7/1995 | Papadopoulos et al. | 709/239 |
| 5,638,516 A | 6/1997 | Duzett et al. | 709/314 |
| 5,721,828 A | 2/1998 | Frisch | 709/217 |
| 5,732,212 A | * 3/1998 | Perholtz et al. | 709/224 |
| 5,884,096 A | * 3/1999 | Beasley et al. | 395/858 |
| 5,937,176 A | * 8/1999 | Beasley et al. | 395/311 |
| 6,009,490 A | * 12/1999 | Fukui et al. | 359/123 |
| 6,112,264 A | * 8/2000 | Beasley et al. | 710/38 |
| 6,304,895 B1 | * 10/2001 | Schneider et al. | 709/203 |
| 6,321,366 B1 | * 11/2001 | Tseng et al. | 703/19 |
| 6,324,605 B1 | * 11/2001 | Rafferty et al. | 710/100 |

* cited by examiner

Primary Examiner—Jeffery A. Brier
Assistant Examiner—Ryan Yang
(74) Attorney, Agent, or Firm—Oblon, Spivak, McClelland, Maier & Neustadt, P.C.

(57) ABSTRACT

A method and system for converting the output of a communications port (e.g., a serial port or a USB port) into video signals representing the output of a terminal. The system is interposed between the communications port and a set of two or more inputs to a keyboard, video and mouse switch. Upon receiving characters from the communications port, the system interprets the characters as terminal emulation commands and internally generates a representation of what a resulting terminal screen would look like. From that internal (digital) representation, the system produces analog outputs representing the terminal screen. The analog outputs are applied to the video input of the KVM switch such that the terminal output can be viewed on the monitor attached to the KVM switch.

10 Claims, 11 Drawing Sheets

TERMINAL EMULATOR FOR INTERFACING BETWEEN A COMMUNICATIONS PORT AND A KVM SWITCH

BACKGROUND OF THE INVENTION

1. Field of the Invention

The present invention is directed to a terminal emulator for use with a keyboard, video and mouse (KVM) switch. More specifically, the present invention provides a converter interposed between a communications interface (e.g., a serial or USB port) of a computer and the three part KVM interface of a KVM switch for converting the (serial) communications into video signals representing a terminal.

2. Description of the Background

Figure 1:
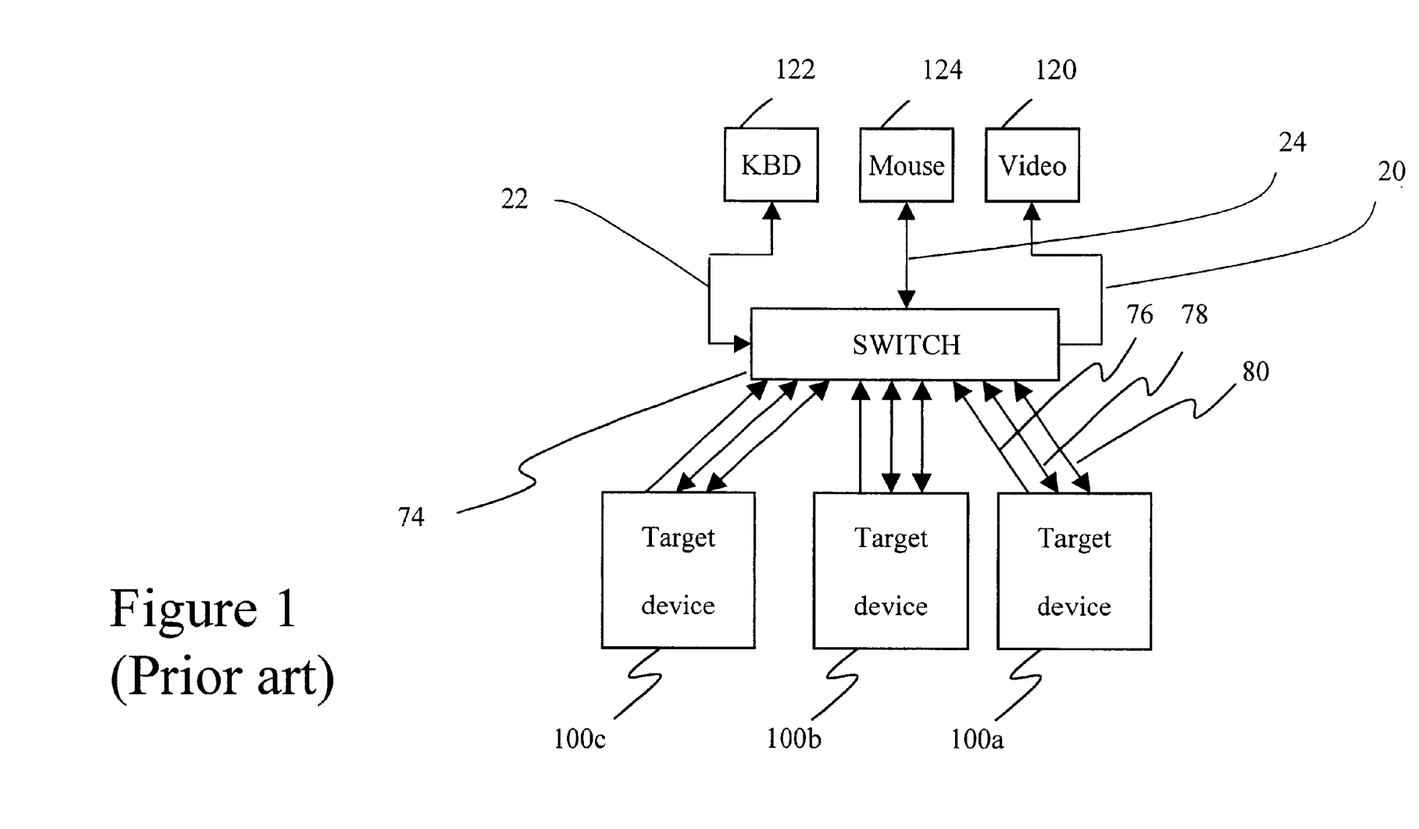
FIG. 1 is a block diagram of an illustrative, known KVM switch connected to (a) plural computers on the computer-interface side and (b) a keyboard, mouse and monitor on the user-interface side.

Apex Inc., the assignee of the present invention, produces and sells a series of switches that enable a single keyboard, mouse and monitor to logically connect to any one of several computers simultaneously. One embodiment of a KVM switch 74 is shown in the block diagram of FIG. 1. Using commands from a keyboard 122, the user may switch between the several computers (100a through 100c). Internally, based on the selection, the switch 74 establishes a set of three connections from the computer-interface side to the user-interface side. Accordingly, the output of the video card of one of the computers is displayed on the video monitor 120 when that computer is selected, and the signals from the keyboard 122 and the mouse 124 are directed to the selected computer as if the keyboard 122 and mouse 124 were directly connected to the selected computer.

Terminal emulators are also known. One use of terminal emulators is to debug the operation of a computer's operating system. Since controlling the monitor is complex for low-level operating system code, it is often impractical to write error messages to a screen to track operations of the operating system. As a result, some operating systems provide support for sending status messages to the serial port of the computer. Such a technique is far less complicated than writing to the screen.

To view the status messages, a terminal (or a computer running a terminal emulator) is connected to the serial port, and the output from the serial port is interpreted as a stream of terminal commands. Those terminal commands enable text to be written to the terminal's screen. Those commands also provide additional control functions such as clearing the screen and changing the attributes (e.g., underlining, inverted color, blinking, and foreground and background color) of a displayed character.

SUMMARY OF THE INVENTION

It is an object of the present invention to convert the output of a communications port (e.g., a serial port or a USB port) of a computer into analog video signals that can be applied to the monitor input of a KVM switch without using a separate computer running a terminal emulator program. The communications port also receives as inputs commands corresponding to changes in a keyboard and/or mouse connected to the KVM switch.

This and other objects of the present invention are provided through a converter that is interposed between the communications port and the KVM switch. The converter includes an analyzer for analyzing the digital output of a communications port and interpreting the digital output as a series of emulator commands. The analyzer determines the resulting digital representation of the location and attributes of the text as the text would appear on a corresponding terminal. Using the digital representation, the analyzer generates an equivalent analog signal in RGB format. That RGB format can then be applied to a monitor input of the KVM switch just like any other connected computer.

Likewise, in the opposite direction, status changes for the keyboard and/or mouse connected to the KVM switch are sent to the connector and converted to commands which are sent to the communications port. In the case of a bi-directionally communicating mouse and/or keyboard, commands can be sent from the communications port to the converter as well.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 10b is an illustration of the equivalent virtual layout of the terminal being emulated using the contents of the memory illustrated in FIG. 9a.

DETAILED DESCRIPTION OF THE PREFERRED EMBODIMENT

Figure 2:
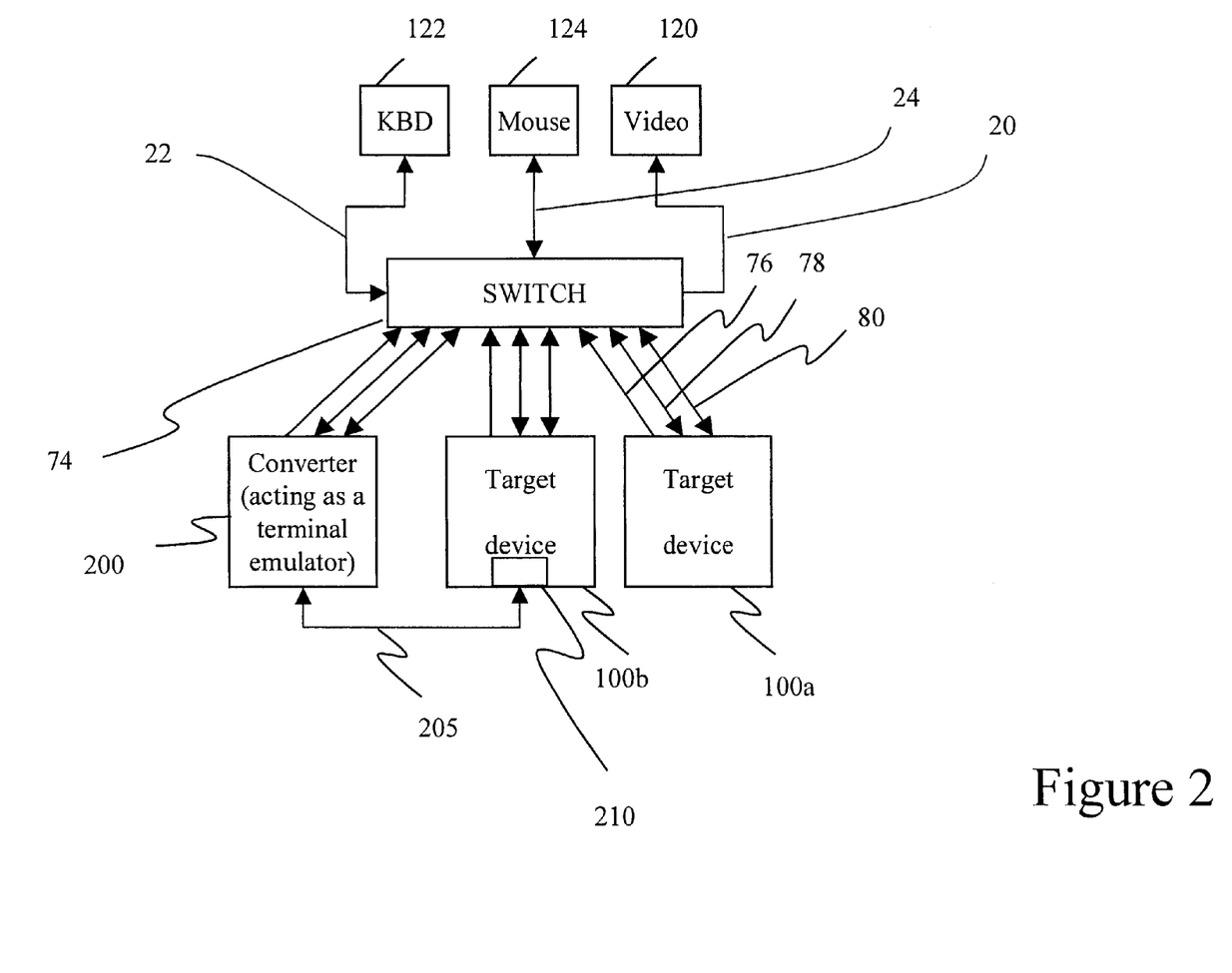
FIG. 2 is a block diagram of the terminal converter of the present invention replacing one of the computers of FIG. 1.

Referring now to the drawings, in which like reference numerals designate identical or corresponding parts throughout the several views, FIG. 2 is a block diagram showing one use of a converter 200 according to the present invention. In this environment, a user is able to control multiple computers (100a and 100b) using a single keyboard 122 and mouse 124. Using commands from a keyboard 122 (and optionally the mouse 124 with or without a keyboard modifier), the user may switch between those computers (100a and 100b). In addition to being able to select the KVM outputs of computer 100b, it is desirable to allow a user to see the output of the communications port 210. To provide this capability, the communications port 210 is connected to a converter 200 (that acts as a terminal emulator) using a cable 205. In a preferred embodiment of the present invention, the communications port 210 is a serial interface and the cable 205 is a null modem cable. The present invention, however, is not limited to direct serial communication. In alternate embodiments, the communications port 210 is a USB port or a parallel port and the cable 205 is a corresponding USB or parallel cable. In yet another alternate embodiment, the cable 205 is replaced by a pair of modems and a telephone connection.

The four above configurations provide "direct" communication with the computer 100b. As used herein, the phrase "direct communication" means that the communication protocol correctly assumes that communication is with only one device. Accordingly, a header (including a device identifier) is not needed before each group (or packet) of information. On the other hand, the phrase "indirect communication" means communication with devices that require a header to identify the recipient of the communication. One example of indirection communication is the use of Ethernet cards that utilize packets with headers to communication information to the appropriate one of many Ethernet devices.

As shown in FIGS. 3 through 7, the present invention includes several possible embodiments. In each embodiment, the present invention internally maintains a digital representation of a virtual terminal whose appearance is controlled by commands from the communications port 210 (of the computer 100b shown in FIG. 2). The digital representation is converted to a set of analog RGB outputs that are output on analog terminal outputs 20. Keyboard commands are received on the keyboard inputs 22 and forwarded to the communications port 210. In embodiments where the terminal supports mouse movements and commands, the mouse commands are received on mouse interface 24 and are forwarded to the communications port 210.

Figure 3:
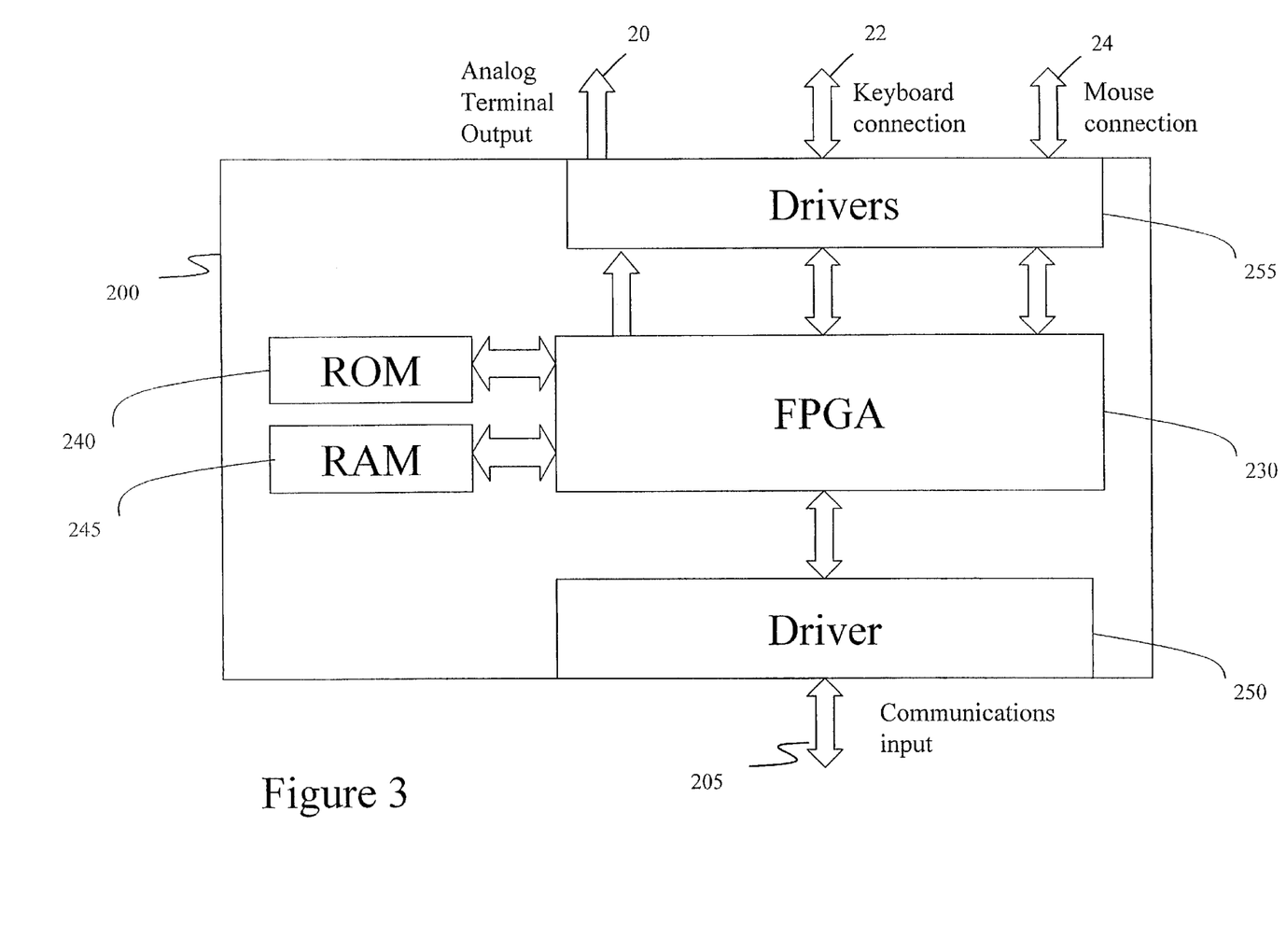
FIG. 3 is a block diagram of a first embodiment of the converter according to the present invention.

As shown in FIG. 3, the cable 205 is connected to a driver 250. The driver converts the voltages and currents on the cable 205 to voltages and currents that can be accepted by a field programmable gate array (FPGA) 230 (or a microprocessor as shown in subsequent figures). Examples of FPGAs are the XC3000 series, the XC4000 series, the XC5200 series and the Spartan series from Xilinx, Inc., of San Jose Calif. (Additional details of the architectures and programming requirements of those series are found in the Programmable Logic Data Book, 1998 edition, the contents of which are incorporated herein by reference. Alternate logic devices from other companies can likewise be used with the present invention.) In a preferred embodiment, an emitter follower is used to convert voltages and currents from the FPGA to voltages and currents that fall within the specifications for the monitor for normal RGB video signals. Having converted the signals from the communications port 210, the FPGA 230 interprets the commands to determine how the virtual (emulated) terminal is changed based on those commands. One such command simply adds an ASCII character at the current cursor location and advances the cursor to the next location of the virtual terminal. Other commands (e.g., carriage return and line feed) change the position where the next character will be inserted.

The FPGA 230 stores the digital representation of the virtual terminal in the RAM 245. Also stored in the RAM 245 are buffered commands that have been received from the driver 250 but which have not yet been acted on by the FPGA 230. The control logic for interpreting the commands (thereby emulating the terminal) and outputting the analog video signals are contained in a ROM 240 which configures the FPGA 230. One example of a ROM 240 is a serial non-volatile memory (e.g., EPROM) with a single-bit wide data bus and a clock signal. Another embodiment of the ROM 240 is a non-volatile memory (e.g., EPROM, EEPROM, Flash ROM, or FRAM) with a multi-bit address and data bus. In either embodiment, the non-volatile memory is preferably a rewriteable memory that can be updated to provide additional features or corrections.

In order to reduce the size of the FPGA required to perform the terminal emulation, the FPGA can be dynamically reconfigured to change from one format (e.g., ANSI) to another format (e.g., VT100) by loading the appropriate format from a ROM connected to the FPGA. In this manner, the FPGA 230 need only provide enough logic gates to (1) provide dynamic reconfiguration and (2) emulate one terminal type at a time.

Figure 5:
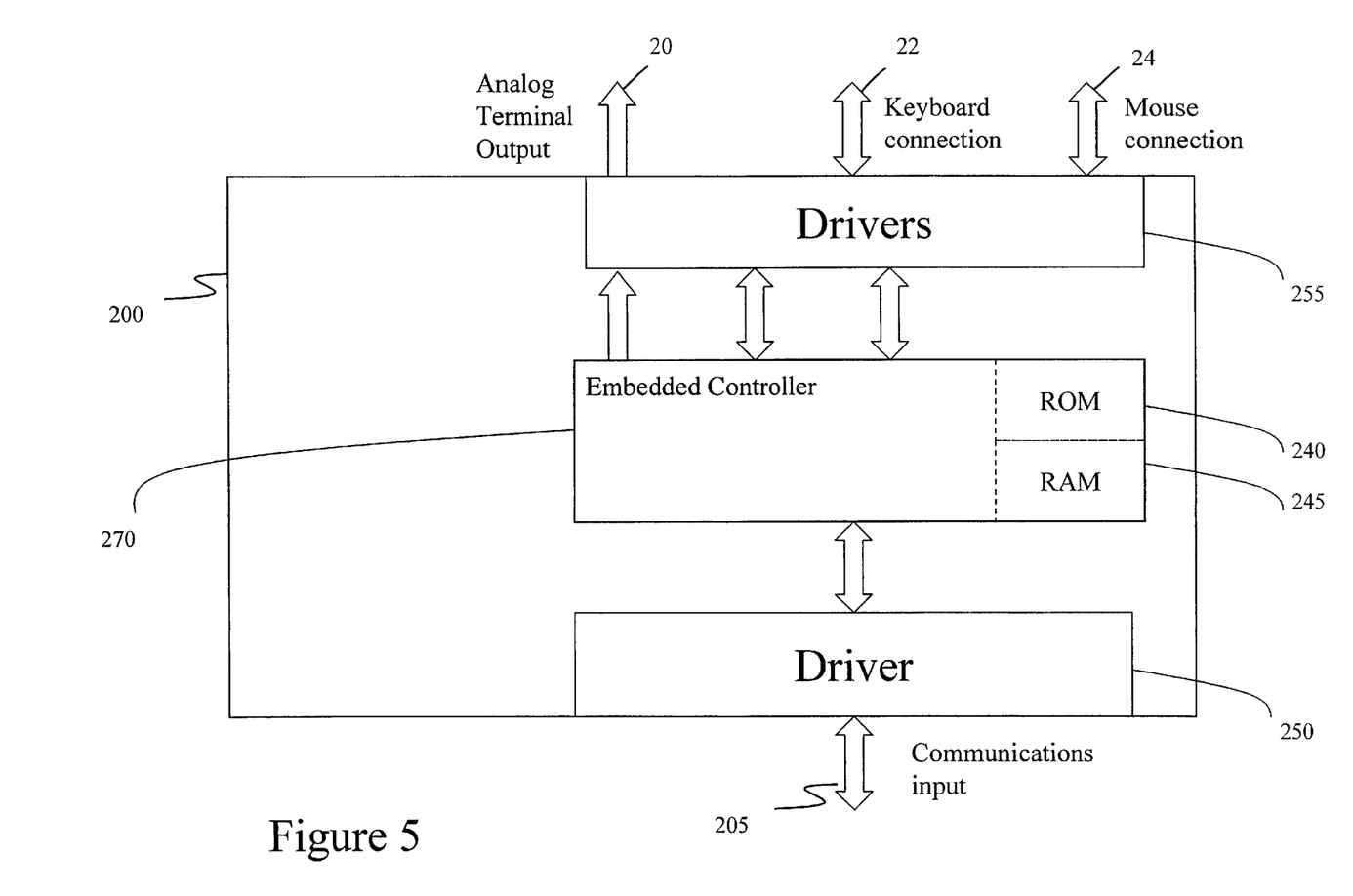
FIG. 5 is a block diagram of a third embodiment of the converter according to the present invention.

One embodiment of the driver 250 in FIGS. 3 and 5 is the SL16 from ScanLogic Corp of Bedford, Mass. The SL16 provides USB communications with external devices. (Additional details of the SL16 architecture can be found in SL16 Hardware Specification: Technical Reference, Revision 1.20 dated Jul. 14, 1998, the contents of which are incorporated herein by reference.)

Figure 4:
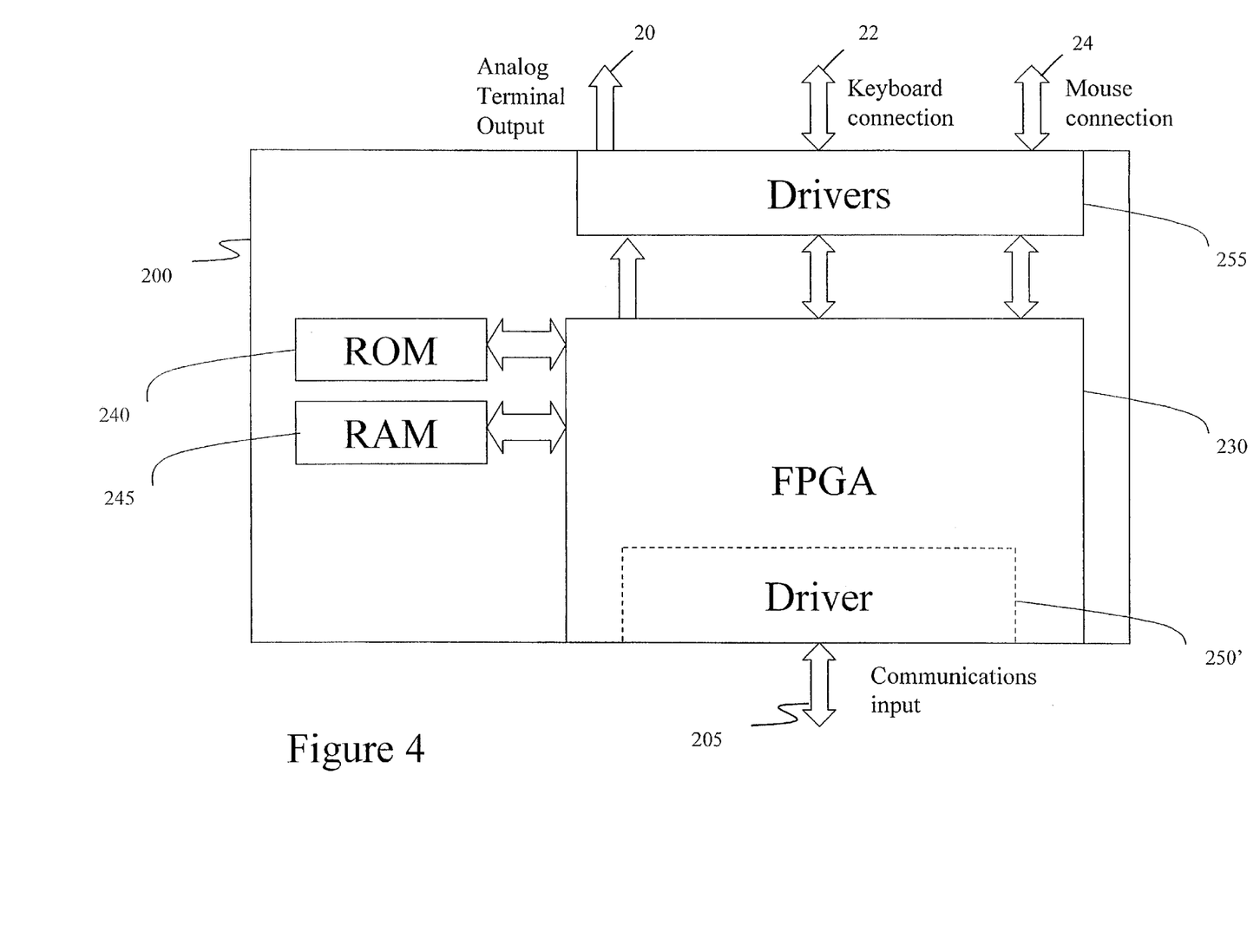
FIG. 4 is a block diagram of a second embodiment of the converter according to the present invention.

In the second embodiment shown in FIG. 4, a driver 250' is incorporated into the FPGA 230 (as opposed to using the external driver 250 in FIG. 3). Using digital logic cells and analog I/O blocks of the FPGA, the FPGA 230 communicates directly with the communications port 210 across cable 205. In an alternate embodiment to that of FIG. 4, the drivers 255 are also included into the FPGA, thereby further reducing the number of chips required to emulate a terminal.

The present invention, however, is not limited to using FPGAs to emulate the terminal. In one alternate embodiment, the FPGA is replaced by a one-time programmable (OTP) device or an application specific integrated circuit (ASIC). Alternatively, as shown in FIG. 5, in the third embodiment of the present invention, an embedded controller 270 (including RAM 245 and ROM 240) communicates with the communications port 210 through the driver 250.

Figure 6:
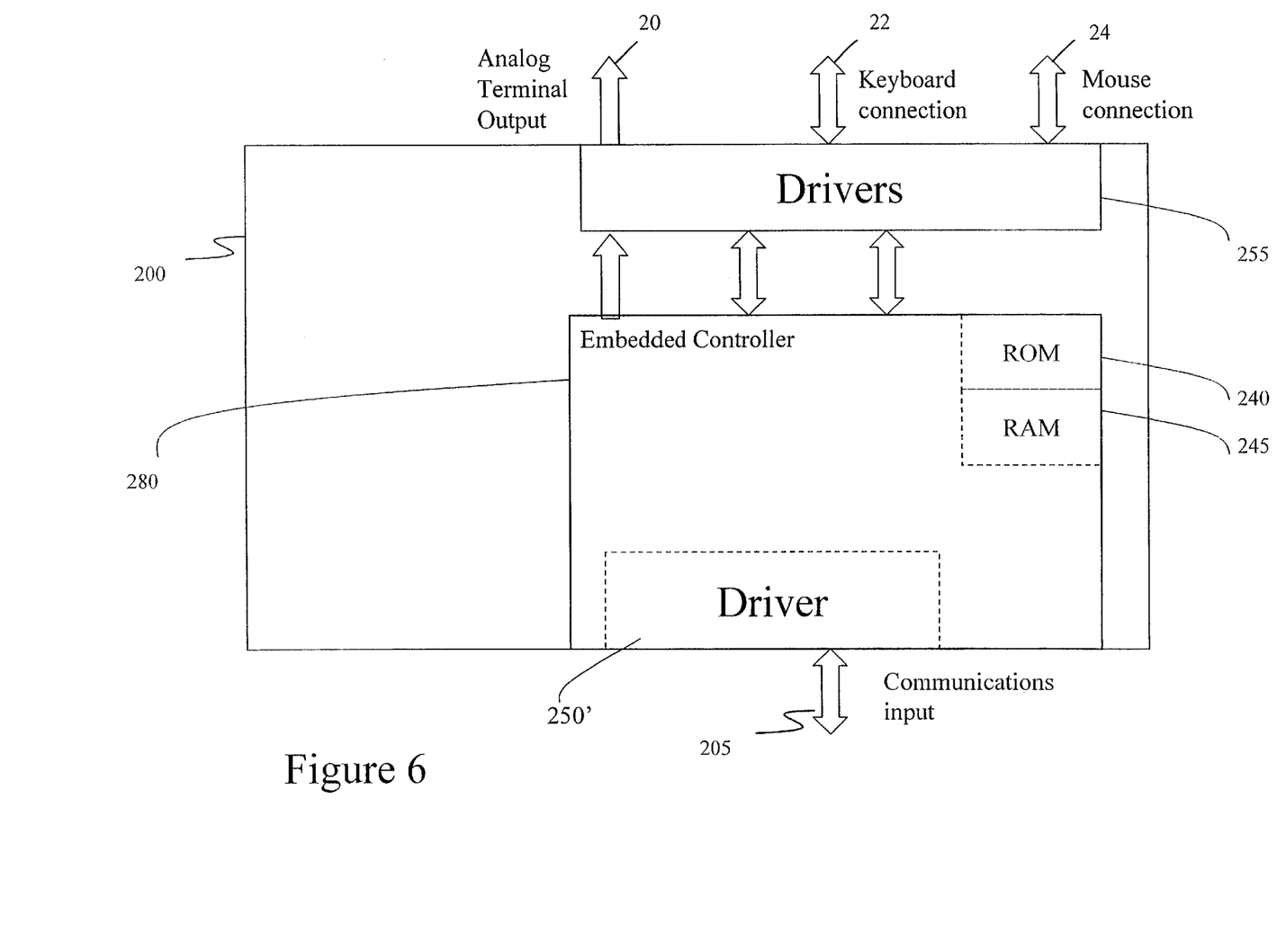
FIG. 6 is a block diagram of a fourth embodiment of the converter according to the present invention.

In the embodiment of the present invention shown in FIG. 6, an embedded controller 280 includes an integrated communications driver 250 and is used to replace the general purpose embedded controller 270 and external driver 250 (shown in FIG. 4). Using this embodiment, the number of components is reduced as compared to the embodiment of FIG. 5. One such embedded controller is the ST90XXX series from STMicroElectronics. Specifically, members of the ST90XXX family include complete serial communications interfaces (SCI) for communicating with external serial devices. (Additional details about that family of devices are available in the June 1998 preliminary technical specification, the contents of which are incorporated herein by reference.)

Figure 7:
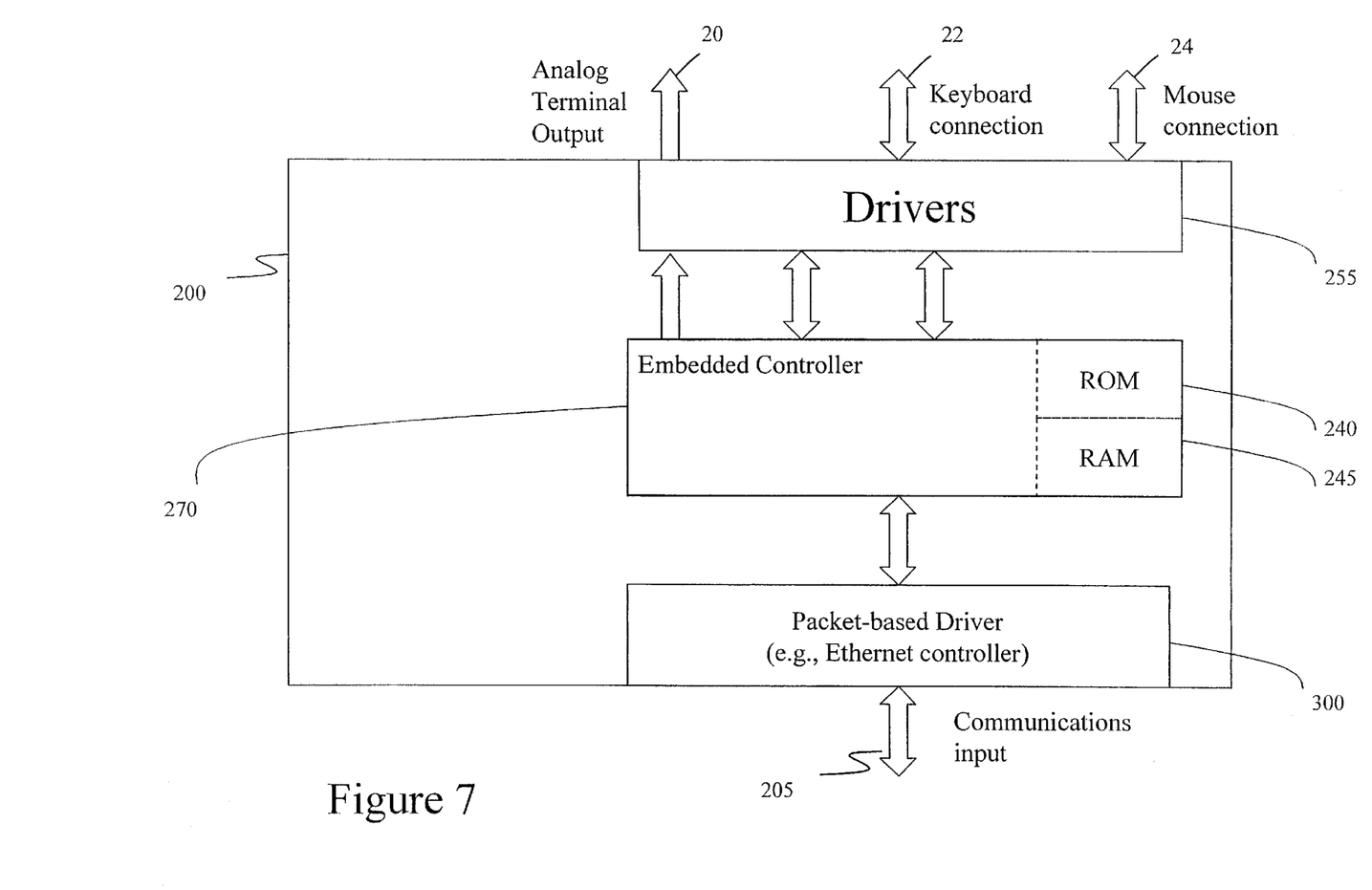
FIG. 7 is a block diagram of a fifth embodiment of the converter according to the present invention.

In an alternate embodiment of the present invention shown in FIG. 7, the converter 200 includes a packet-based driver 300, such as an Ethernet controller. (This driver 300 likewise can be used with the FPGA implementations of FIGS. 3 and 4). Packets destined for the converter (as identified by the header of the packet) that are sent by the communications port 210 are stripped of their headers and then treated as packets from a direct connection.

Figure 8:
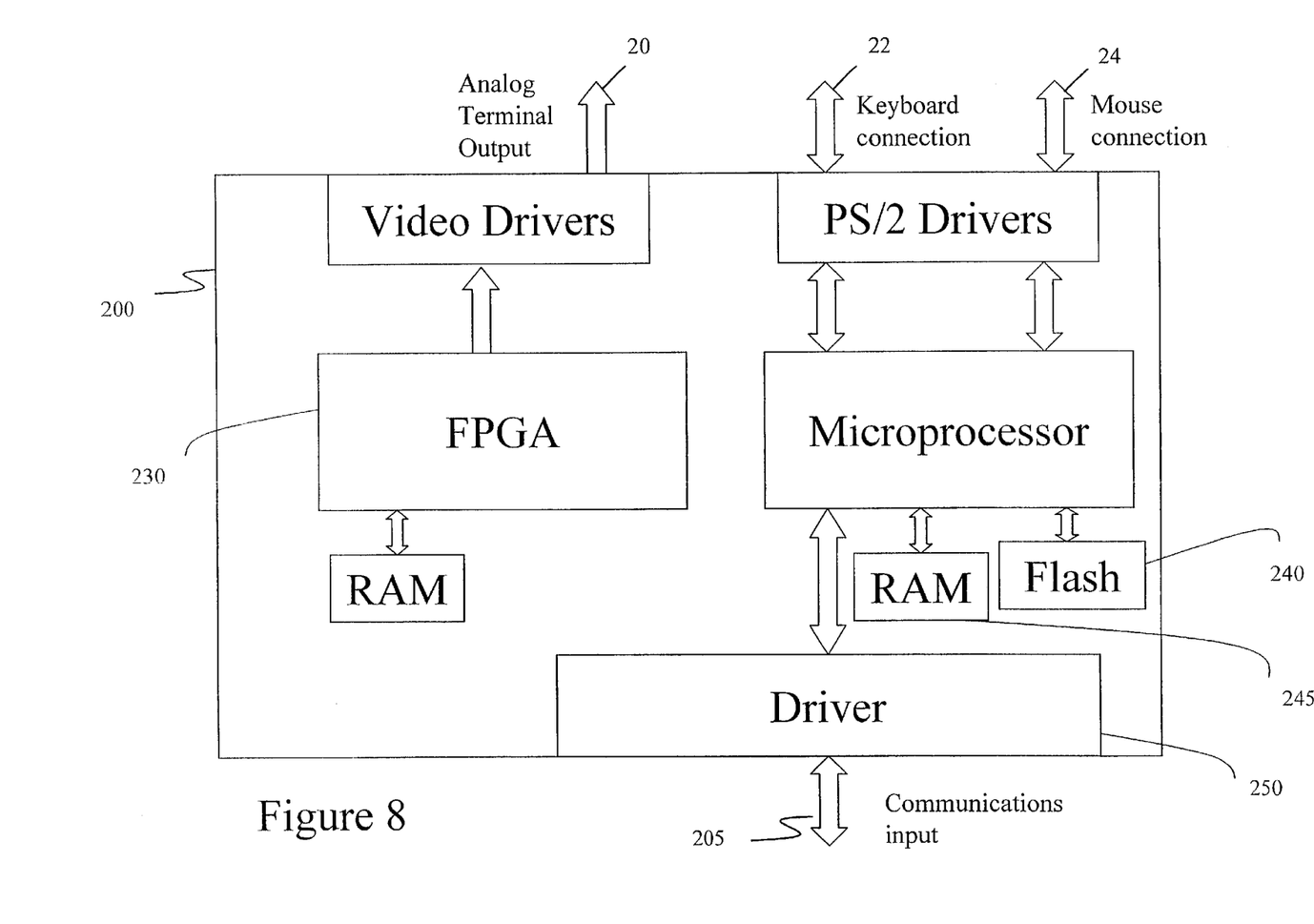
FIG. 8 is a block diagram of a sixth embodiment of the converter according to the present invention.

In the sixth embodiment, shown in FIG. 8, a combined microprocessor and FPGA design is used. This provides the greatest flexibility of all the disclosed designs.

Figure 9:
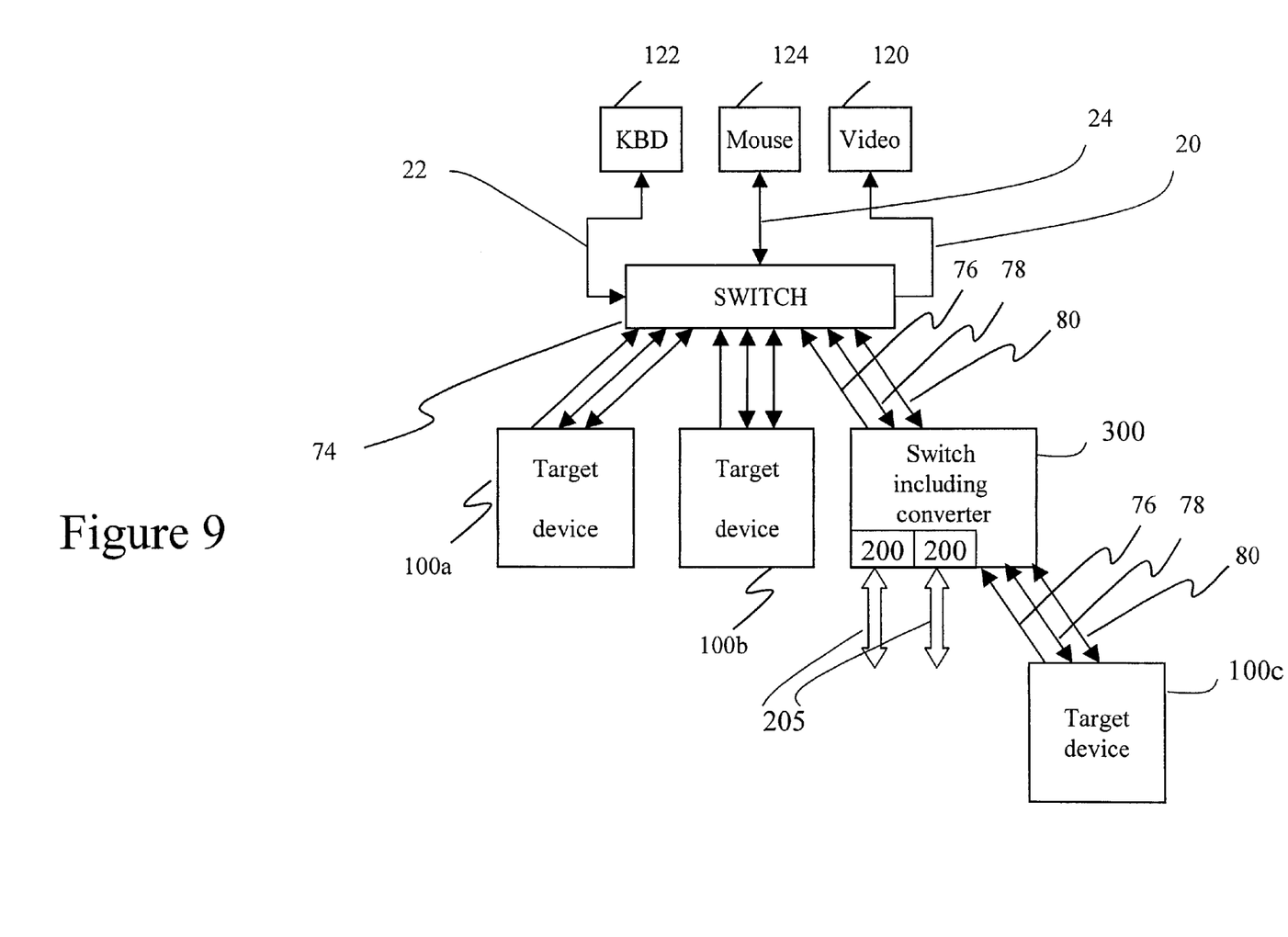
FIG. 9 is a block diagram of a KVM switch incorporating a converter according to the present invention.

As shown in FIG. 9, the converter 200 may also be incorporated into a KVM switch 300 directly. In this embodiment, at least one set of KVM connections (76, 78 and 80) are replaced with a connection for receiving the cable 205. The video outputs of the virtual terminal are converted so as to be output from the switch 300 to either a monitor 120 or to another switch (74 or 300) in a hierarchy of switches.

Figure 10A:
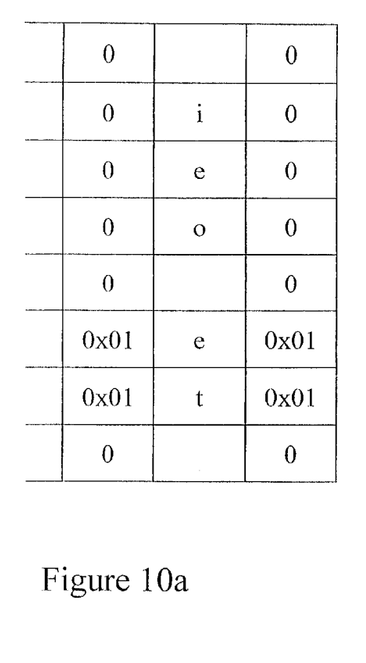
FIG. 10a is a block diagram of a portion of the memory of the converter that includes the characters to be displayed and their attributes.

As shown in FIG. 10a, the memory of the converter 200 includes a representation of how the emulated screen should look. For each position on the screen, the memory includes a character to be drawn at that position as well as an attribute for that character. Characters can have zero or more attributes applied to them simultaneously. In one embodiment, each attribute is represented by a single bit of an 8-bit attribute. Thus, the underline bit may be bit zero such that an underlined character (with no other attributes turned on) would have an attribute of $2^0=1$ (which in hexadecimal notation is indicated as 0x01). As shown in FIG. 10a, the letters forming the word "text" are underlined since they each include an attribute set to 0x01.

Figure 10B:
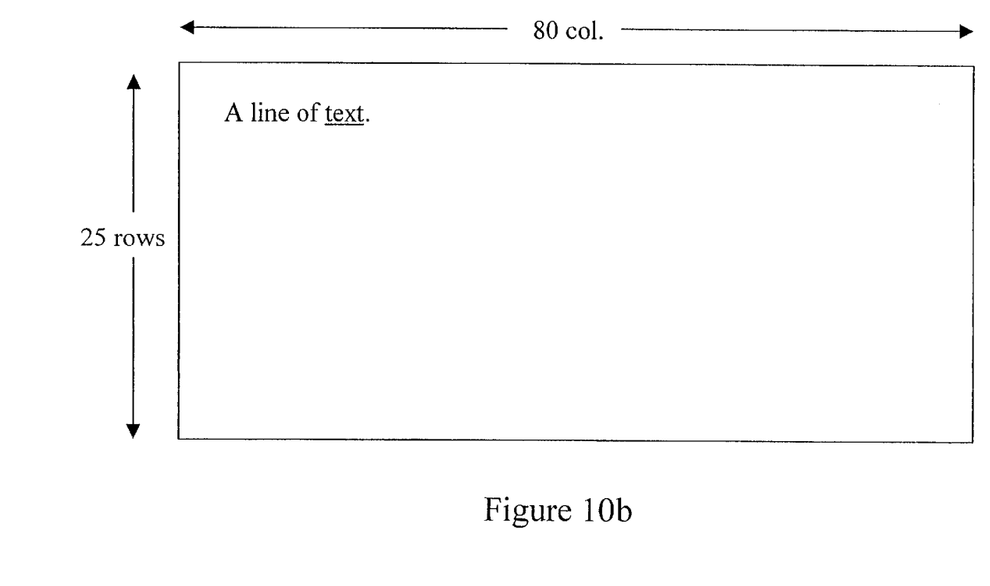
Figure 10C:
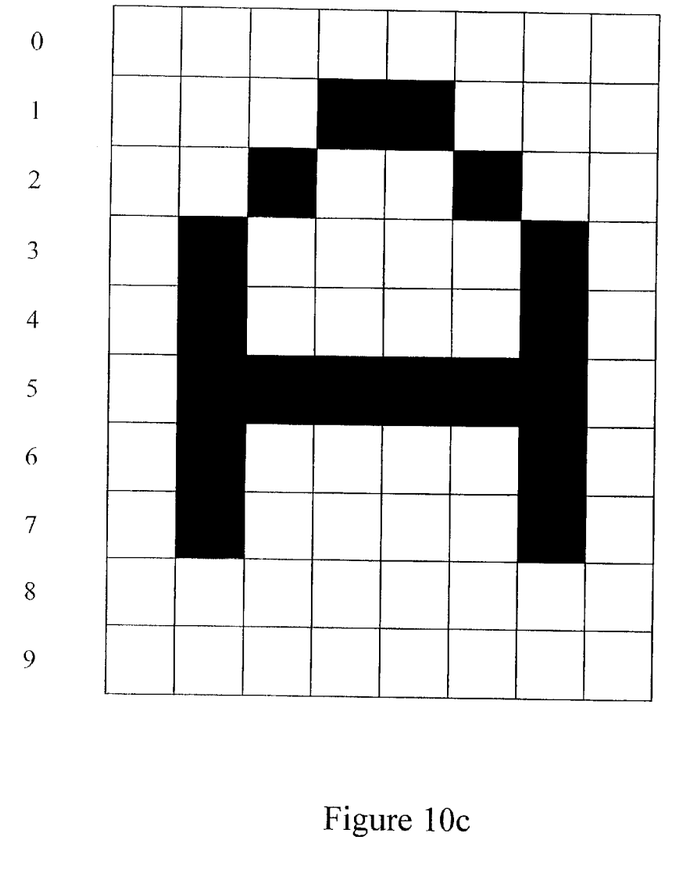
FIG. 10c is a bitmap representation of one of the characters to be displayed by the converter.

In order to convert the format of FIG. 10a into the representation shown in FIG. 10b, the converter 200 must convert each character into a corresponding set of analog output signals (broken into rows). For example, when the converter 200 is beginning the output process for the text "A line of text." as shown in FIG. 10a, the converter 200 dedicates the first n pixel values to the first row of the bitmap corresponding to the letter "A". For example, as shown in FIG. 10c, an eight-bit wide bitmap is used to represent the letter "A". As such, eight pixels are written out (in RGB format) in the background color since no pixels are turned on in the first row of the letter "A" bitmap. If space is not already included as part of the character bitmaps, then the system would automatically write any standard space between characters (e.g., 2 pixels) in the background color as well. After the first line of the bitmaps of all the letters in the row are processed. The converter 200 then generates an HSYNC signal. The next row of the same bitmaps are subsequently processed. For example, in the second row of the bitmap corresponding to the letter "A", two out of 8 pixels are written out in the foreground color while the remaining eight are written out in the background color.

This process is repeated for the remaining rows in the bitmaps for first line of text. In the case of characters that are underlined, all pixels in the underline row (e.g., row 8 of FIG. 10c) are turned "on" in the foreground color for characters. The process is repeated for the remaining lines of text. In the case of a character with the inverted bit set, the background color is used as the foreground color and vice versa when that character is written out. In an alternate embodiment of the present invention, the per-character attributes are extended to include foreground and background colors for each character. In that embodiment it is possible to provide multi-color text as part of the output of the converter 200.

Although the virtual terminal (and corresponding actual video signals) is shown as being 80 columns of characters by 25 rows of characters, other configurations are possible. In fact, the system may change terminal size or font type or size upon request. To change font type, the system changes to using an alternate bitmap for the letters.

In yet another embodiment of the present invention, the converter 200 generates a bitmap of the entire screen internally and that bitmap is written out line-by-line. In that embodiment, it is possible to generate graphics as well as text. In that embodiment, the interpreted commands must be capable of describing the graphics to be drawn. This embodiment, however, requires substantially more memory than the text-based embodiment. Nonetheless, based on the dramatic decrease in cost of memory, this embodiment provides greatly enhanced functionality at a modest increase in price.

The present invention includes numerous alternative embodiment with one or more emulator types including, but not limited to: VT100, VT52, VT220, VT102, ANSI, ASCII, WYSE, Postscript, Windows GDI calls and Java AWT calls. Any description language that defines an image and/or interaction with keyboard and mouse can be emulated using the principles of the present invention.

The present invention also includes alternative embodiments using various communications ports, including but not limited to: wired (e.g., RS-232, USB, parallel, Ethernet, Token Ring, FDDI and ATM) and wireless (e.g., Ricochet, RF, and IR).

It is also possible to utilize a core set of functionality (using a microprocessor, an FPGA or both) that interfaces to various input and output "personalities" (which are generally equivalent to the drivers shown in FIGS. 3–8). By utilizing the core set of functionality, new drivers can be developed and interchanged quickly. Such an approach is analogous to defining an object interface in an object-oriented language.

Some terminals have an audible "click" sound that they produce. This sound is probably an aural "feel-good" replacement for the old keyboards that came with a terminal (the keys were very mechanical and clicked when pressed). The mechanical click can be replaced with an electronic substitute "click" sound. The sound is produced in response to the converter receiving a keystroke from the attached keyboard (or switch). When the keystroke is processed the FPGA or microprocessor enables an external counter/timer pin which goes to a transistor drive circuit. The transistor driver turns on and off current to a speaker thus producing the "click" sound.

Obviously, numerous modifications and variations of the present invention are possible in light of the above teachings. It is therefore to be understood that, within the scope of the appended claims, the invention may be practiced otherwise than as specifically described herein.

What is claimed is:

1. A converter for interfacing between a KVM switch and a communications port, the converter comprising:
    a digital memory;
    a receiver configured to receive terminal commands from a communications port;
    an analyzer configured to analyze the terminal commands and update a digital representation of a virtual terminal stored in the digital memory, based on the terminal commands;
    a circuit configured to scan the digital memory and generate analog RGB signals and synchronization signals; and
    analog drivers for driving the analog RGB signals out to a KVM switch.

2. The converter as claimed in claim 1, wherein the circuit comprises plural bitmaps representing line-by-line representations of characters stored in the digital memory.

3. The converter as claimed in claim 1, wherein the analyzer and the circuit are implemented in a field-programmable gate array.

4. The converter as claimed in claim 3, further comprising a configuration memory, wherein the field-programmable gate array is dynamically loaded with a configuration, from the configuration memory, corresponding to a type of terminal to be emulated.

5. The converter as claimed in claim 1, wherein the terminal commands are commands for a text-based terminal.

6. The converter as claimed in claim 1, wherein the terminal commands are commands for a graphics-based terminal.

7. The converter as claimed in claim 1, wherein the communications port comprises a serial port.

8. The converter as claimed in claim 1, wherein the communications port comprises a Universal Serial Bus port.

9. The converter as claimed in claim 1, wherein the communications port comprises a parallel port.

10. The converter as claimed in claim 1, wherein the communications port comprises a packet-based communications port.

* * * * *